Patented July 22, 1924.

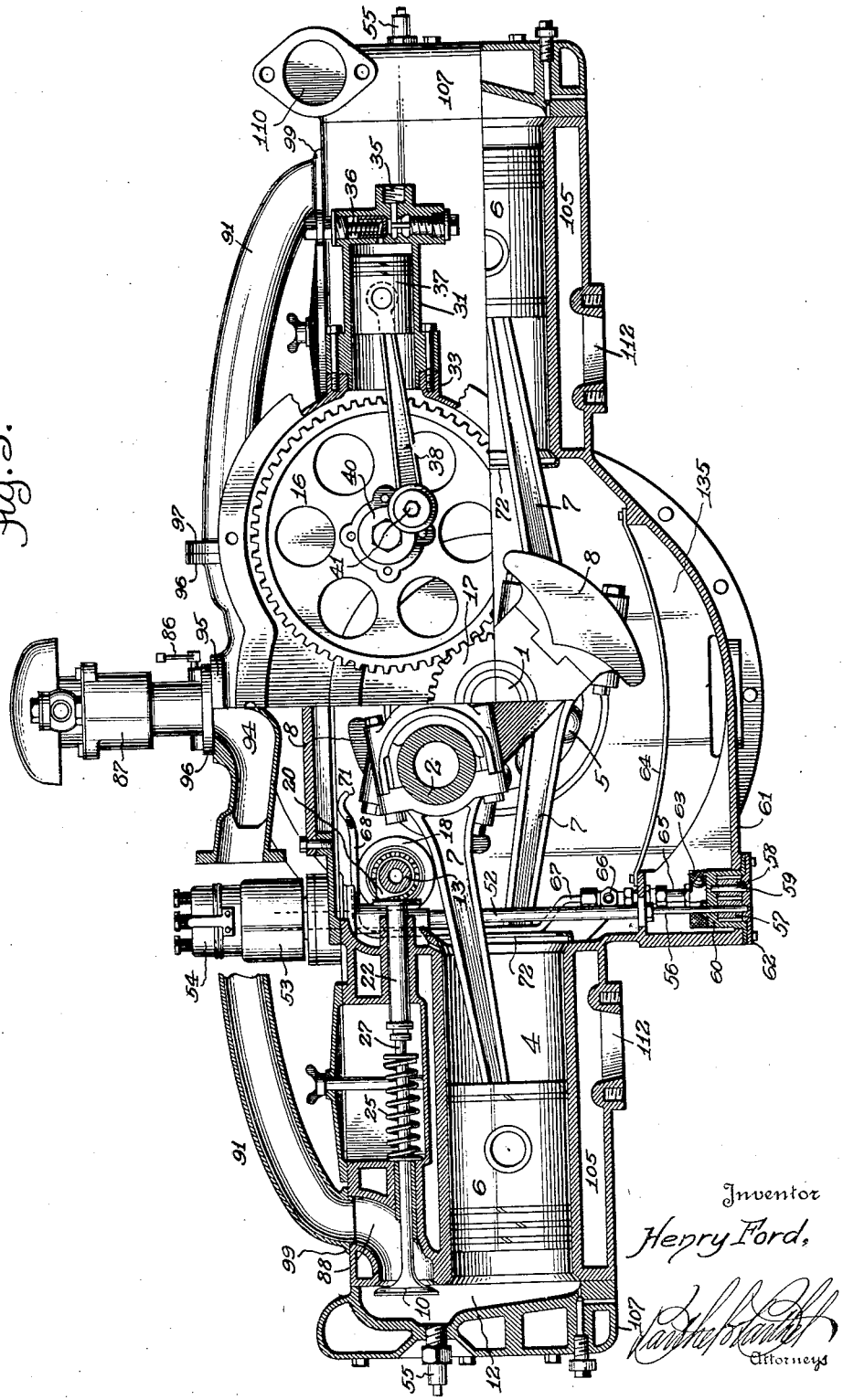

1,502,240

UNITED STATES PATENT OFFICE.

HENRY FORD, OF DEARBORN, MICHIGAN.

LOCOMOTIVE POWER PLANT.

Application filed January 3, 1922. Serial No. 526,539.

*To all whom it may concern:*

Be it known that I, HENRY FORD, a citizen of the United States of America, residing at Dearborn, in the county of Wayne and State of Michigan, have invented certain new and useful Improvements in Locomotive Power Plants, of which the following is a specification, reference being had therein to the accompanying drawings.

My invention relates to railway rolling stock and more particularly relates to locomotive power plants therefor, that may be adapted to provide motive power and to supply electrical, pneumatic and other auxiliary equipment.

The general object of the invention is to provide a compact, complete and efficient power plant of this character. Further objects of the invention are to provide an improved locomotive motor; to incorporate auxiliaries in said motor; and to organize a duplex power plant with auxiliaries in a unit.

Figure 1:
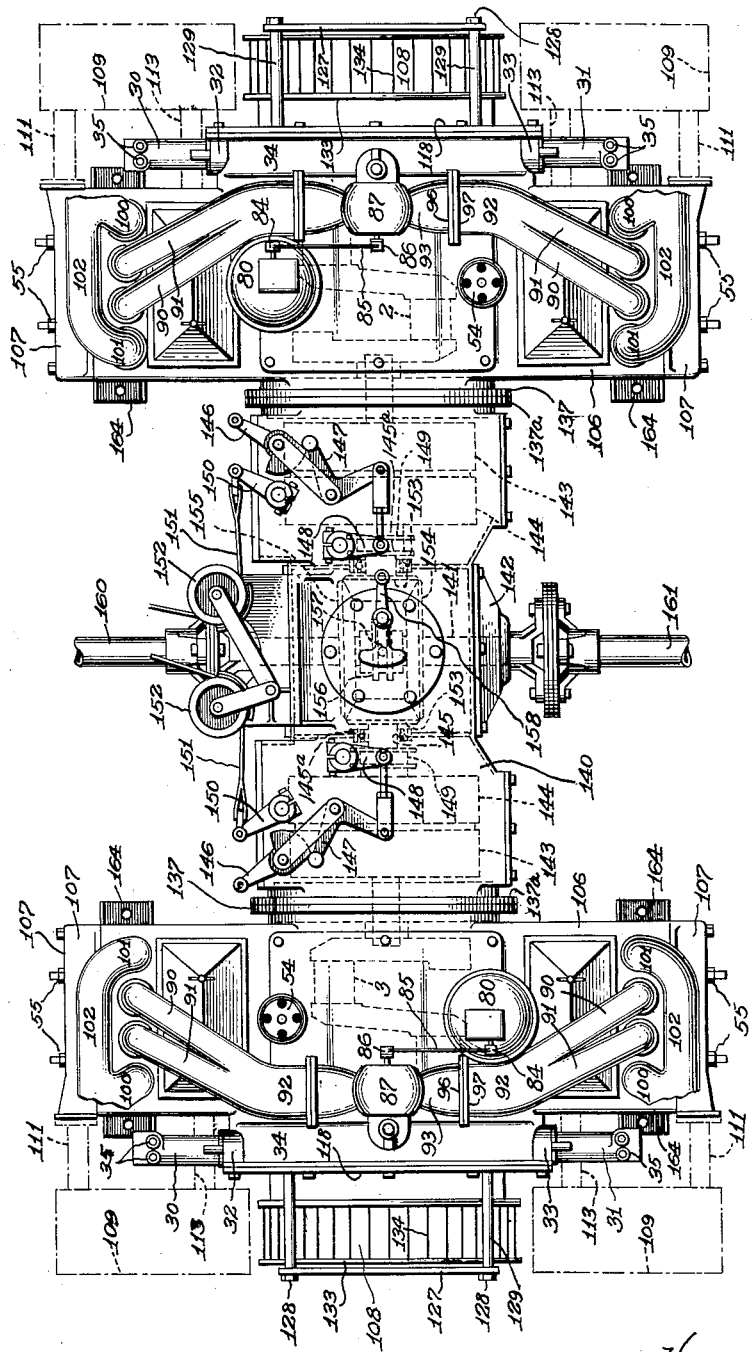
Figure 2:
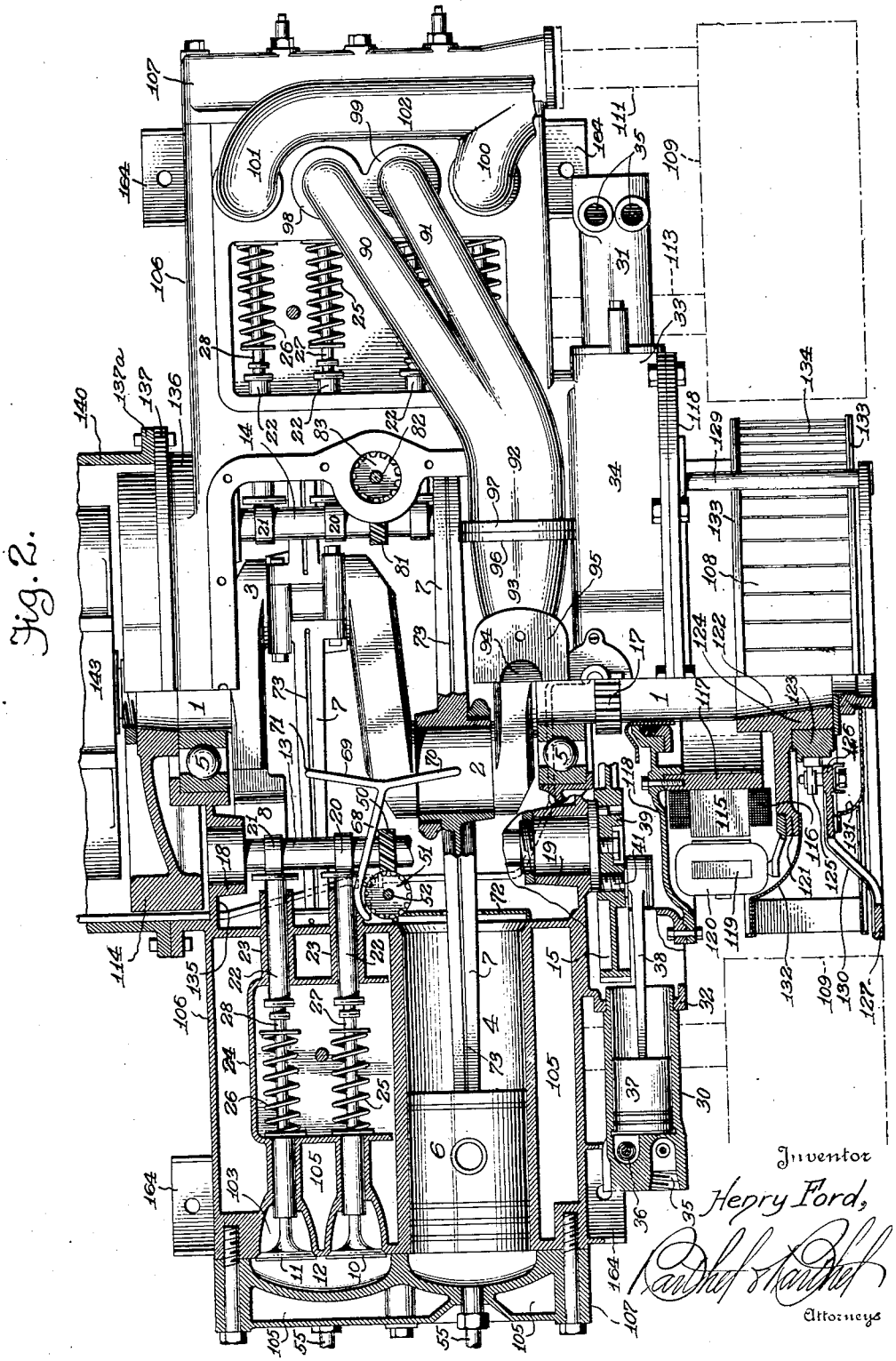

To these and other ends, my invention may consist in a railway car power plant shown as a single embodiment of my invention in the accompanying drawings, wherein:

Figure 1 is a plan view of a duplex power plant with auxiliaries, organized and constructed in accordance with and embodying my invention;

Fig. 2 is an enlarged plan view, partly in section, of one of the motors with auxiliaries and a fragmentary portion of the transmission system embodied in the power plant shown in Fig. 1; and Fig. 3 is an elevation of the portion of the power plant shown in Fig. 2, viewing the latter from its outer lateral extremity as disposed in Fig. 1; parts being removed and broken away to more clearly disclose the construction and operation thereof.

The power plant illustrated is especially adapted for installation beneath the floor and between the trucks of a double truck automotive railway car such as set forth in an application, Serial No. 469,146, filed May 13, 1921. It embodies, generally, in a single horizontal unit a duplex transmission gear system at either end of which is arranged one of a pair of engines embodying pneumatic and electrical auxiliaries. The unit is contracted and somewhat uniform in height and in horizontal perimetric outline may simulate the capital letter H or I. It is thus conveniently accommodated between the trucks of the car with the transmission gear system, (the single bar of the letter simulated) extending transversely and the engine structures (the parallel bars of said letter) extending parallel to the center line of the car. The drive system extends transversely of and substantially horizontally from the central portion of the transmission gear system in opposite directions to the front and rear car trucks respectively.

Mechanical power output of the engines of the power plant unit is designed to be applied from the transmission system to the traction wheels of the car to provide it with motive and tractive power. The pneumatic auxiliary is primarily for compressing air which may conveniently be stored to supply air brakes, whistle and other pneumatic equipment of the car or train. And the electrical auxiliary is a dynamo electric machine or set for starting the engines and generating electricity which may conveniently be stored for supplying car lighting or other electrical equipment or for starting the engines which are preferably of the internal combustion type.

Each of the engines is a horizontally disposed four cylinder opposed, four cycle, internal combustion engine embodying generally a crank or engine shaft 1 having a pair of 180 degree throw cranks 2 and 3 with which co-operate the two sets of alined pairs of cylinders 4. The crank shaft is journaled on a pair of annular ball bearings 5 and the pistons 6 of the cylinders 4 are connected in co-operative relation with the cranks by the pitmans 7 (as set forth in an application Serial No. 472,589, filed May 25, 1921), whereas the flywheel mass may be distributed on opposite protruding ends of the engine shaft. The balancing system of the engine includes the counter weights 8.

The engine valve gear for actuating the inlet and exhaust valves 10 and 11 respectively, located adjacent to the combustion chamber 12 of the respective cylinder, and operating to control the flow of a cylinder charge: includes a pair of cam shafts 13 and 14, one individual to the valves of each bank of cylinders, driven respectively by the cam shaft gears 15 and 16 meshing with the crank shaft pinion 17 common to both. These gears and their pinions are rigidly mounted on their respective shafts and the cam shafts 13 and 14 are, respectively, journaled in their bearings 18 and 19. Each of the cam shafts is provided with a pair of inlet valve cams 20 and exhaust valve cams 21. These cams each co-operate with an individual push rod 22 sliding in a push rod guide 23 constituting a tubular extension of the casing 24 for the valve springs 25 and 26, the push rods each engaging with its individual valve stem 27 or 28 of the inlet or exhaust valves respectively. In addition to actuating the valves, the cam shafts also actute the air compressors, the ignition and lubricating apparatus, and the governor.

The air compressors for each motor comprise a pair of single acting cylinders 30 and 31 arranged at one side of each bank of engine cylinders, the open end of each compressor cylinder facing and being adjacent to the periphery of one of the cam shaft gears.

The cylinders 30 and 31 are mounted at their open ends in the bosses 32 and 33 respectively, formed at the sides of the casing 34 enclosing the half time gearing. These cylinders are seated in their mounting and held in place by a plurality of cap screws as shown. Within the head of each of the cylinders 30 and 31 is provided the air inlet and discharge ports 35 and their respective spring loaded automatic valves 36, whereas in the bore of each of the compressor cylinders is fitted a reciprocable piston 37 operatively connected by a pitman 38 to an overhanging crank rigid with the adjacent cam shaft. The compressor crank for each of the pitmen 38 may be built up by crank pins journaled in the respective pitman heads and rigidly secured to the respective hubs 39 and 40 of the cam shaft gears 15 and 16, by the screwthreaded studs 41.

On the cam shaft 13, disposed to the left of the crank shaft as viewed in Figs. 2 and 3, there is rigidly mounted a spiral gear 50 meshing with the corresponding gear 51 rigidly secured to a vertical rotatable spindle 52 on the upper end of which is mounted a rotatable element of the ignition system which may include the primary circuit breaker 53 and a distributor 54 for the secondary circuit, the terminals of which are connected individually to the spark plugs 55 of the respective cylinders. The lower end of the rotatable shaft 52 is coupled to the rotatable spindle 56 of the spur gear 57, which is thereby rotated; together with its enmeshed companion gear 58 journaled about the axis of its shaft 59. The meshing gears 57 and 58 constitute the impellers of the rotary gear oil pump 60 which is secured to the lower wall 61 of the engine crank case by means of its flanges 62. The gauze covered inlet 63 of this pump communicates with the oil well formed between the lower wall 61 of the engine casing and the partition wall 64 forming the lower wall of the crank chamber whereas the discharge opening of the pump is connected to a supply pipe 65. The oil is thus drawn from the oil well and delivered through the supply pipe to the various oil ducts of the lubricating system which convey the oil to spouts or orifices that supply the elements or surfaces to be lubricated. These ducts as shown in the drawings include two systems, one for supplying lubricant to the engine mechanism and the other to the transmission mechanism.

These two systems of the lubricating system start off from the delivery pipe 65 at the T or cross fitting 66, the vertically extending pipe comprising a section of the engine system and one horizontally extending branch the transmission system of oil ducts. The system for the engine includes a tubular riser 67 which extends upwardly into the upper part of the crank chamber and then turns laterally into the horizontal section 68 which is subsequently divided into the branches 69 and 70 each terminating in an orifice or nozzle 71 preferably so disposed that the oil therefrom will drip or flow on to the crank and pitman mechanism within the engine crank chamber, whereby the entire mechanism contained within and communicating with this chamber will be supplied with oil. Suitable provision is made to enhance the proper distribution of oil and to prevent flooding of certain surfaces requiring only limited lubrication. Included in the structure provided to this end are: the cylinder bore baffle plates 72 provided with elongated openings for the pitman rods, and the oil channels 73 extending longitudinally along the upper sides of the pitmen to the wrist pin bearings.

For driving the rotatable elements of the governor mechanism included within a casing 80, a spiral gear 81 is rigidly mounted on the cam shaft 14 and meshing therewith and rigidly mounted on the governor mechanism spindle 82 is a corresponding spiral gear 83. The throttle valve controlling arm 84 of the governor mechanism is operatively connected by means of a link 85 to a throttle valve lever 86 of the carbureter 87 which is mounted upon a four branch manifold system connecting the throttle chamber of the carbureter with the passages 88 of the inlet valves 10 of the respective cylinders.

This manifold system is in three parts, namely, two offset Y branch sections and an intermediate contiguous T section. The Y branch sections include a pair of tubular diverging branches 90 and 91 merging into a common throat 92; and the T section comprises a pair of branches corresponding in cross section to the throat 92 merging into a common chamber 94. The chamber 94 of the manifold T fitting is provided with a flange 95 upon which is mounted and to which is secured the flange 96 formed on the throttle valve chamber of the carbureter 87, whereas, the branches 93 and the mutually communicating throats 92 of the respective branch sections of the manifold, are respectively provided with the flanges 96 and 97 through which pass suitable bolts for securing the three sections of the manifold systems together into an integral unit. The branches 90 and 91 of each of the branch sections are provided with the flanges 98 and 99 whereby the manifold system is connected and secured to the mouths of the inlet passages 88. Similarly branches 100 and 101 of each of the exhaust manifolds 102 are flanged and fitted for connection to and seating at the outlet openings of the exhaust passages 103.

In its present embodiment this engine is water cooled, and accordingly the water jacketing spaces 105 are provided about the cylinder walls, their head and the valve structure. The water cooling system for each of the contiguously pairing cylinders, their combustion spaces and their valve structure embodied within the twin cylinder blocks 106 and their removable heads 107; is independent. Thus although the air blast for cooling the water of the cooling system for each of the engine units is derived from a common blower 108, preferably of the sirocco or other centrifugal type and mounted on the outer end of each of the crank shafts 1; an individual radiator 109 is provided for each of the cooling water systems of each of the motor units. The cooling sections of these radiators are disposed in the air blast path of the blower 108 and the water system of each of the radiators is independently connected to its cylinder block. The water receiving chamber of each of the radiators is connected to the discharge opening 110 of the corresponding cylinder block by a pipe or tube 111, and the water jacket inlet openings 112 are connected by a suitable pipe or tube 113 to discharge chambers of their respective radiators. In the present embodiment the water circulation is obtained on the thermo-siphon principle, the course of the water being from the water system of each radiator through the pipe 113 into the jacket of the cylinder block through the opening 112 thence through the passages of the jacket, into those of the head of the block, then out through the jacket discharge opening 110, through the pipe 111 back to the individual radiator system.

For supplying the electrical output of the power plant and for power starting of the motors, a dynamo electric machine, adapted to operate as either a generator or a motor, is interposed between the blower rotor and the adjacent side of the engine casing. The rotating mass of this machine augments the flywheel 114, the engine flywheel mass being thus divided in two parts on opposite ends of the crank shaft. It will be observed that the electric generator which, when starting the engine is used as a motor, is direct-connected to the crank shaft. Accordingly the field of the generator including the pole pieces 115 and their field coils 116 are rigidly mounted peripherally about an annular field frame 117 rigidly secured to the adjacent end of the engine casing, preferably the end plate 118 of the engine crank case extension 34 wherein are housed the gears for operating the valve mechanism, and concentrically of the crank shaft; and the rotatable armature of the generator, which may be of the Gramme ring type including a ring core 119 provided with a continuous or a series of coils 120 and preferably surrounding the field peripherally, is carried by a spider 121 common to the generator armature and the blower rotor. This spider is rigidly mounted concentrically on the tapered end 122 of the crank shaft. The commutator 123 of the generator is mounted rigidly upon the hub 124 of the spider 121 and its brushes 125 are individually carried on a common brush holder 126. This brush holder is formed rigid with and centrally of the circular end plate 127 spanning the intake end of the blower rotor and providing for the support of the brush holder and the brush and commutator shield. The end plate 127 is secured to the motor casing end plate 118 by the bolts 128 and their tubular spacing pieces 129. The air inlet to the blower 108 is provided through the end plate 127 by a series of apertures 130 arranged in the annular section of the plate between its brush holder section 126 and its peripheral margin. To prevent the incoming blast of air entering the blower from fouling the brushes and commutator, a cover plate or shield 131 is provided, and to similarly protect the field and armature of the generator and the connections to the latter the web or spider rigidly connecting the peripheral portions of the blower structure to its hub 124, and including the spider 121 and the web shield or baffle plate 132 are preferably made impervious. It will be observed that the principal load and stress imposed upon the flange 121 is due to the weight and torque of the generator armature. For the rotating mass of the blower rotor consisting of a pair of annular rims 133 to which are secured and between which extend the blades 134, and the web 132 whereby the rotor is attached to the flange 121; is light in weight and subject to little torsional stress.

About the flywheel 114, and beyond the crank case end wall 135 is formed a substantially annular extension 136 integral with the engine casing and provided with a flange 137. The two engines, see Fig. 1, are connected together into a single integral power plant, by the substantially tubular casing 140 of the duplex transmission gear system through which the drive of the jack shaft 141 journaled at its ends in the cover plates 142, is obtained.

The transmission gear system includes, generally, a pair of planetary transmission gear-sets each including a clutch and a brake individual to each engine shaft, and intermediate their respective transmission shafts and the common jack shaft, a transversing and reversing gear common to both. The transmission is set forth in detail in a co-pending application, Serial No. 573,623 filed July 8, 1922, and is herein described briefly as related to the motors and as incorporated in the power plant.

Each of the speed reducing gear-sets are of the planetary type. The change speed or speed reducing planetary gearing is arranged within the drum 143 and a friction clutch for obtaining a direct drive is arranged within the drum 144. Both of these mechanisms are adapted to selectively connect its individual engine shaft with the corresponding transmission shaft 145. The planetary speed reducing gear is controlled by an expansible and contractible band embracing the drum 143 and is caused to grip or release its drum by a mechanism including a lever 146 which also operates a bell crank 147 linked to a lever 148 engaging with the yoke collar 149 adapted to engage and disengage the clutch included within the drum 144. Embracing the exterior of the drum 144 is an expansible and contractible brake band controlled by a lever 150. Both the mechanism including the levers 146 and 150 are spring returned and are operated by a cable such as 151, passing, at suitable intervals, around the sheaves 152. It may be preferred to connect the corresponding levers 146 and 150 together so that they operate simultaneously and in this event an equalizer may be placed in the cable system.

The transmission shaft 145 is supported at one end by its engine shaft and at its other end this shaft is provided with a journal bearing 145ª interposed between the collar 149 and the bevel pinion 153. This pinion is rigidly mounted on the end of its shaft. The shafts 145 and their driving pinions 153 are mutually opposed, the latter simultaneously meshing with both of the mutually opposed bevel master gears 154 and 155 mounted on the jack shaft 141, to be freely rotatable about said jack shaft but longitudinally immovable thereon. The inner opposed faces of the gears 154 and 155 are provided with toothed dog clutch faces adapted to engage with corresponding opposed faces of the toothed dog clutch 156 mounted on the jack shaft between the master gears to be longitudinally slidable in either direction but rotatably immovable on the jack shaft. When in a central position the clutch is disengaged and clears the co-operating elements of the master gears and the latter are free to idle on the jack shaft. But when the clutch 156 is shifted into engagement with either of the master gears it couples that particular gear rigidly to the jack shaft and permits the other gear to idle. Since the two master gears rotate oppositely, a reversing gear is thus provided. The dog clutch 156 is provided with a swivel yoke collar 157 engaged by shifting a mechanism including a lever 158. When this lever occupies a central position, the master gears are both disengaged, but when the lever is shifted to and held in either of its extreme positions, the clutch 156 is shifted into engagement with the master gear corresponding to its movement and that gear is coupled to the jack shaft.

It will be observed that the engine shafts rotate in opposite directions and that their transmission and their pinions are constantly in mesh with both of the beveled gears 154 and 155. Thus when the gear 154 is coupled to the jack shaft, the latter will be rotated in one direction, whereas if the gear 155 is coupled thereto it will be rotated in the opposite direction. The propeller shafts 160 and 161, which are flexibly coupled, one to either end of the jack shaft and extend one to the traction wheel drive at either end of the car, are thus rotated either to propel the car in a forward or in a reverse direction.

The engine and transmission sections of the power plant unit are alined and united by the flanges 137 and 137ª formed respectively on the transmission and engine case or frame structure and bolted together. The resulting structure is readily machined, built up and assembled; and a durable rigid structure is secured that may be readily and satisfactorily mounted upon a simple frame of an engine bed by the feet 164.

What I claim is:

1. A railway car power plant consisting in the combination of a horizontally extending transmission gear system embodying a pair of opposed transmission units arranged one at either end of the system, a shaft arranged between and transversely of said units, a bevel gear driving connection interposed between said shaft and transmission units, and a pair of horizontally disposed motors arranged one at either end of said gear system.

2. A railway car power plant consisting in the combination of an elongated transmission gear system embodying a pair of opposed transmission units arranged one at either end of the system, a shaft arranged between and transversely of the axis of said units, a forward and reverse driving gear interposed between said shaft and transmission units, and a pair of engines connected one to either end of the transmission gear system, said engines having their cylinders disposed transversely of the longitudinal axis of said system.

In testimony whereof I affix my signature in presence of two witnesses.

HENRY FORD.

Witnesses:
 E. G. SIEBOLD,
 J. E. HALL.